(12) United States Patent
Pino

(10) Patent No.: US 7,261,275 B1
(45) Date of Patent: *Aug. 28, 2007

(54) RELIEF VALVE FOR USE IN A DIAPHRAGM FLUSH VALVE

(76) Inventor: Wilton J. Pino, 12333 S. Choctaw Dr., Baton Rouge, LA (US) 70815

( * ) Notice: Subject to any disclaimer, the term of this patent is extended or adjusted under 35 U.S.C. 154(b) by 0 days.

This patent is subject to a terminal disclaimer.

(21) Appl. No.: 11/083,670

(22) Filed: Mar. 18, 2005

(51) Int. Cl.
*F16K 31/12* (2006.01)

(52) U.S. Cl. .......................................... 251/40; 251/38

(58) Field of Classification Search .................. 251/40, 251/38, 39
See application file for complete search history.

(56) References Cited

U.S. PATENT DOCUMENTS

| | | | | |
|---|---|---|---|---|
| 2,024,270 A | * | 12/1935 | Binnall | ........................ 251/21 |
| 3,083,732 A | * | 4/1963 | Becker | ................... 137/624.14 |
| 6,189,554 B1 | * | 2/2001 | Pino | ............................... 137/1 |
| 6,923,426 B1 | * | 8/2005 | Pino | ............................ 251/40 |

* cited by examiner

*Primary Examiner*—Eric Keasel
*Assistant Examiner*—John K. Fristoe, Jr.
(74) *Attorney, Agent, or Firm*—Roy, Kiesel, et al.

(57) ABSTRACT

An improved relief valve for use in a diaphragm flush valve is constructed having a sealing member provided with an exteriorly threaded shaft extending down into the diaphragm flush valve with a smaller diameter metal stem extending from the bottom of the shaft, a sleeve member slidable along the metal stem and having a vertically aligned slit in its side wall, and a retaining member adjustably vertically positioned on the threaded sealing member shaft, wherein the retaining member having a stop element extendable into the vertical slit to prevent the sleeve member from dropping further than a predetermined distance from the bottom of the threaded shaft.

2 Claims, 4 Drawing Sheets

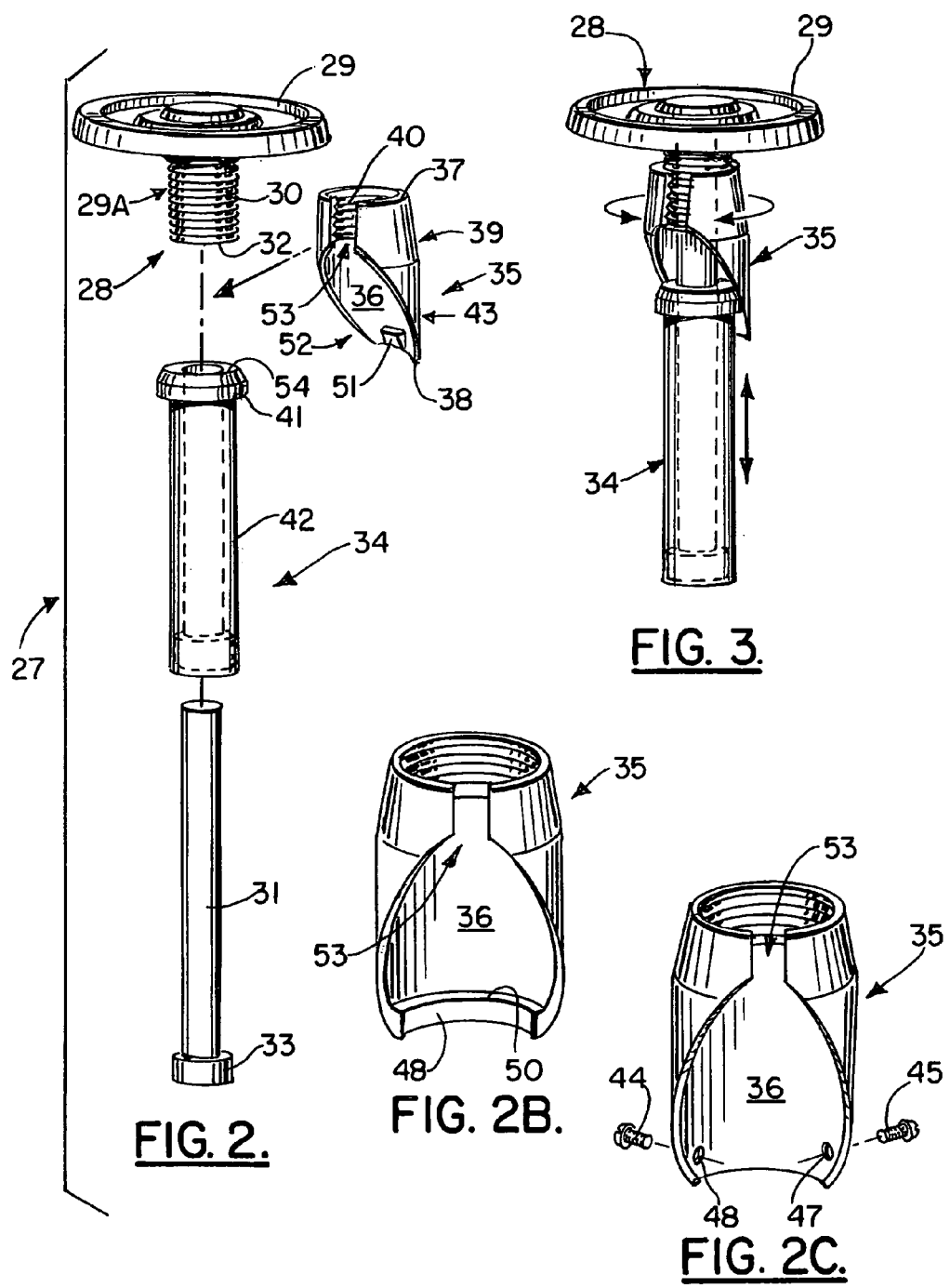

RELIEF VALVE FOR USE IN A DIAPHRAGM FLUSH VALVE

BACKGROUND OF THE INVENTION

1. Field of the Invention

This invention relates to diaphragm flush valves, and more particularly to relief valves used in a diaphragm flush valve.

2. Prior Art

Diaphragm flush valves have long been used in water closets and urinals. As the need to conserve water resulting from economic and environmental concerns has increased there has arisen a need to control the amount of water permitted to flow through the water closet or urinal during a single flushing operation. There has also arisen a need to control the rapidity that the flushing operation can be repeated.

These concerns have been addressed through a variety of improvements to the diaphragm flush valve and related vacuum breaker systems used in water closets and urinals. Exemplary of such improvements are the inventions described in U.S. Pat. Nos. 5,026,021, 5,325,547, 6,119,713, 6,189,554, 6,227,219 and 6,554,018.

However, because of the varying water pressures at the inlet side of the diaphragm flush valves and the wide variety of commercially available diaphragm flush valves, the initial calibration and subsequent servicing of these diaphragm flush valves has remained more difficult and time than desired.

SUMMARY OF THE INVENTION

Therefore, it is an object of the invention to provide a diaphragm flush valve that can easily be adjusted to the water pressure at its inlet side to regulate the water flow through the valve during a flushing operation.

Another object of the invention is to provide an improved relief valve for use with a wide variety of diaphragm flush valves that can easily and quickly be adjusted to regulate the water flow through the diaphragm flush valve during a flushing operation.

Other objects and advantages of this invention shall become apparent from the ensuing descriptions of the invention.

Accordingly, an improved relief valve for use in a diaphragm flush valve is constructed having its sealing member provided with a threaded shaft extendable toward the outlet side of the diaphragm flush valve, a tube member having a passageway housing the upper shoulder section of the sleeve member and provided with a stop to retain the upper shoulder section in the passageway. The passageway will be of sufficient length to permit the sleeve member to travel a predetermined distance within the passageway to allow for the activation of the relief valve by the diaphragm flush valve plunger.

BRIEF DESCRIPTION OF THE DRAWINGS

The description of the inventions set forth below and the accompanying drawings show and describe preferred embodiments of this invention, but it is to be understood that these embodiments are not intended to be exhaustive, nor limiting of the invention, but on the contrary are given for the purpose of illustration in order that others skilled in the art may fully understand the invention and the principles thereof and the manner of applying them in practical use so that they may modify and adapt the invention in various forms, each as may be best suited to the conditions of a particular use.

FIG. 2 is an exploded view of a preferred embodiment of the relief valve of this invention.

FIG. 2B is cross-sectional view of an alternate preferred embodiment of the tube member forming part of the relief valve having a lower lip acting as a stop for the sleeve.

FIG. 2C is a cross-sectional view of an alternate preferred embodiment of the tube member forming part of the relief valve having a dimple acting as a stop to the sleeve.

FIG. 3 is a cross-sectional view of a preferred embodiment of the relief valve of this invention.

PREFERRED EMBODIMENTS OF THE INVENTION

As used in this patent, the phrase "diaphragm flush valve" refers to a flush valve having a fluid inlet chamber, an upper chamber and an outlet chamber, wherein the chambers are separated from one another by a flexible diaphragm provided with a by-pass opening connecting the fluid inlet chamber to the upper chamber and with a central opening connecting the upper and outlet chambers, which central opening can be sealed by a relief valve assembly comprising a relief valve having a sealing member provided with a vertically disposed stem about which a sleeve member can freely slide a predetermined distance, and a plunger assembly having a flush initiating means which when engaged causes a plunger pin to operatively contact the sleeve member unseating the sealing member and permitting flow of fluid from the upper chamber to the lower chamber.

Figure 1:
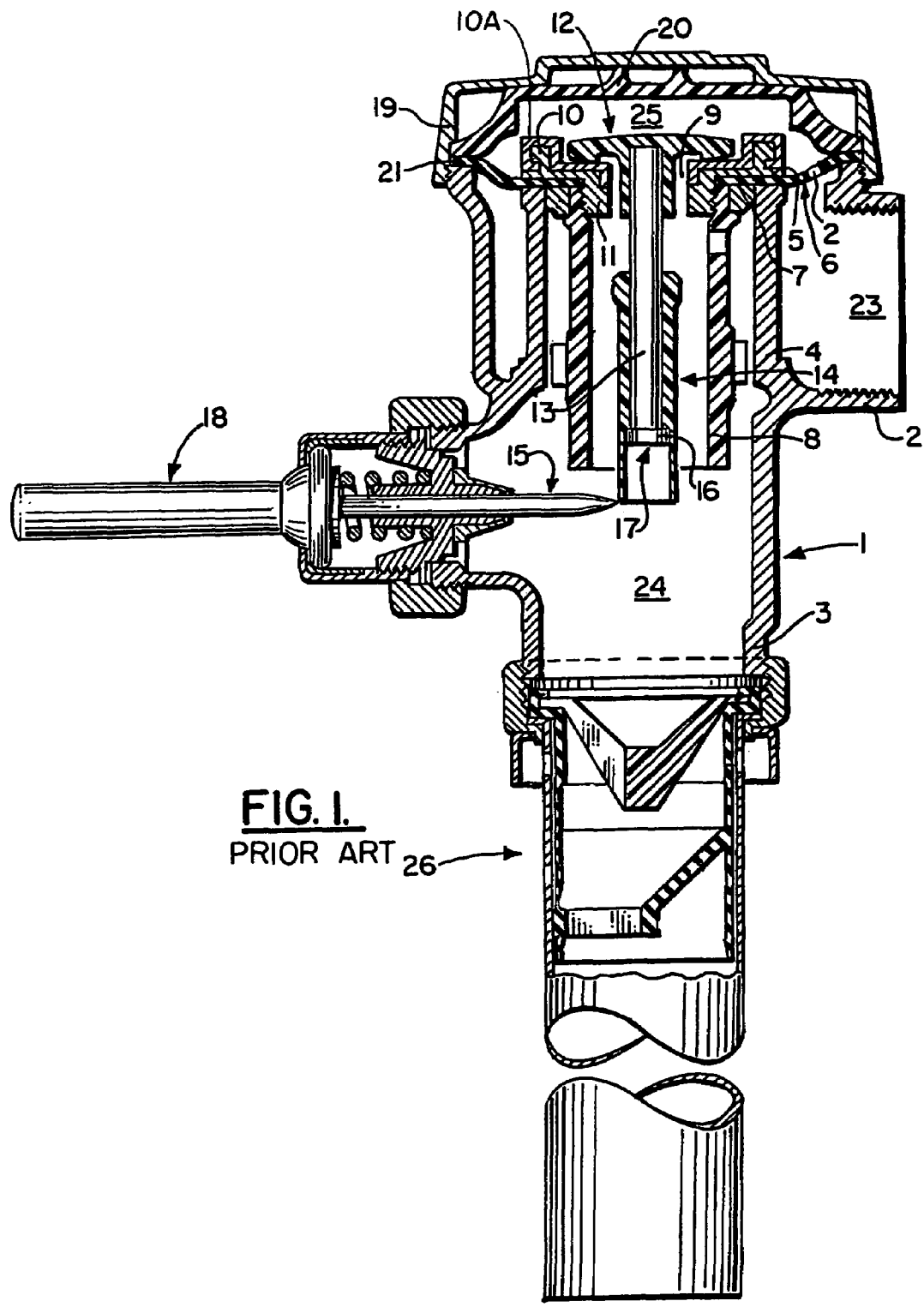
FIG. 1 is a cross-sectional view of a conventional diaphragm flush valve that can be retrofitted with the relief valve of this invention.

A prior art embodiment of a diaphragm flush valve is illustrated in FIG. 1. The flush valve includes a brass body 1 provided with an inlet section 2 connectable to a pressurized water supply. Inlet section 2 forms inlet chamber 23. Body 1 also is provided with an outlet section 3 forming an outlet chamber 24 through which water exits the flush valve. Between the inlet and outlet sections there is an internal upstanding barrel 4. The upper edge portion of barrel 4 forms the annular main valve seat 5. The main valve member comprises a flexible circular rubber diaphragm 6 having a bottom valve seating portion 7 and which is clamped to the top end of a cylindrical guide member 8 extending downward within the barrel 4. The diaphragm 6 is provided with a central opening 9 through which a clamping disc 10 extends with a portion 11 threaded into the guide member 8 and thereby clamps the diaphragm 6 tightly between them. A relief valve 12 constructed having a sealing member 12A positioned on the seat 10A of clamping disc 10 to seal the central opening 9. Relief valve 12 is also constructed having a shaft 12B extending downward from sealing member 12A, through central opening 9 and toward outlet chamber 24. Shaft 12B is provided with an opening 12C into which a metal stem 13 is pressed. Stem 13 extends downward through the diaphragm opening 9 and within the guide member 8. Sleeve member 14 slides up and down stem 13.

Stem 13 is provided with a shoulder 16 whose upper surface 17 acts as a stop to set the lowest position of sleeve member 14 on stem 13. At this lowest position sleeve member 14 is positioned opposite plunger pin 15. Plunger pin 15 actively engages sleeve member 14 by its inward movement into the flush valve outlet chamber 24 when handle 18 is moved off axis from plunger pin 15. Other flush initiating means include various electronic sensors or mechanical push button devices, such as those described in U.S. Pat. Nos. 2,507,966, 2,688,141, 3,066,314, 3,695,288, 3,778,023 and 4,891,864.

The valve body 1 is provided with an external cover 19 and an internal cover 20. The external cover 19 is threaded around the top end of the body 1. It is provided with a shoulder that engages the outer peripheral edge of internal cover 20 and presses it downwardly against the edge 21 of the diaphragm 6 to clamp the diaphragm firmly around its periphery into position in the valve body.

In the ordinary operation of the flush valve described, the water pressures in inlet chamber 23 and upper chamber 25 are equalized above and below the diaphragm 6 by the flow of water through the small by-pass opening 22. Since the pressure area above the diaphragm in upper chamber 25 is greater than that in outlet chamber 24 below the diaphragm 6, the diaphragm 6 is held tightly against main valve seat 5, thereby shutting off the water flow between the inlet chamber 23 and the outlet chamber 24. The engagement of the plunger pin 15 with sleeve member 14 causes stem 13 to tilt from its vertical axis. The tilting of stem 13 cause sealing member 12A to tilt and break the seal between it and clamping disc 10. With sealing member 12A tilted, water can flow from the upper chamber 23 through guide member 8 and into the outlet chamber 23. This reduction in pressure now permits water from the inlet chamber 23 to flex and lift diaphragm 6 from main valve seat 5 permitting water to flow from inlet chamber 23 over the top edge of barrel 4 and into outlet chamber 24 to initiate the flushing action. Once plunger pin 15 is no longer operatively contacting sleeve member 14; i.e., no longer causing sleeve member 14 to tilt or otherwise prevent relief valve 12 can be reseated. This allows water from the inlet chamber 23 to refill upper chamber 25 until the pressure in upper chamber 25 is again equalized to that in inlet chamber 23. With the pressure again equalized, diaphragm 6 reseats preventing further flow of water from the inlet chamber 23 to the outlet chamber 24. The amount of water that flows into the outlet chamber 23 is controlled at least in part by the time required to achieve pressure equalization in the inlet and upper chambers resulting from the refilling of upper chamber 24 with water.

Sleeve member 14 depending from stem 13 is constructed to slide up along stem 13 a sufficient distance to permit sleeve member 14 to rest in a non-operative position above plunger pin 15 if the flush handle 18 is held unduly long in the operated position. In this position the relief valve 12 is no longer tilted and will automatically reseat closing central opening 9. In a normal flushing action, flush handle 18 is pushed off axis and then quickly released. In this case, sleeve member 14 descends to its original position and relief valve 12 is reseated. Typically, this unseating and reseating of the relief valve 12 takes place in less than one second. This is generally sufficient time to permit diaphragm 6 to be unseated by the water pressure in inlet chamber 23, for the desired amount of water to flow first into outlet chamber 24, and then through vacuum breaker assembly 26 to the water closet bowl (not shown) to complete the flushing action. However, if the water pressure is too low or too high, then the time between unseating and reseating of the relief valve 12 needs to be varied from the norm.

Figure 2A:
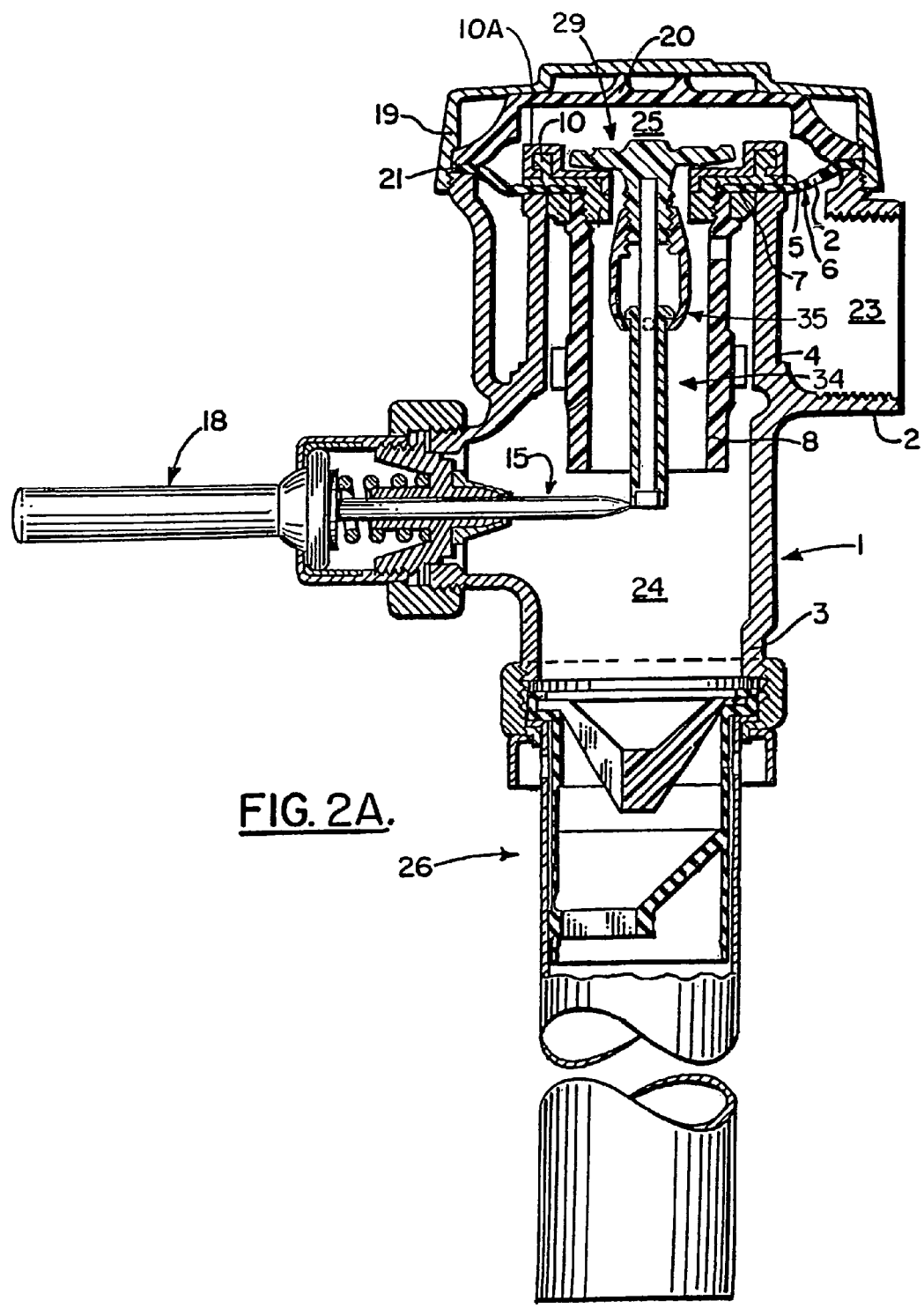
FIG. 2A is a cross-sectional view taken along lines I-I of FIG. 1 wherein the relief valve of this invention has been substituted for the conventional relief valve.

It has been found that adjusting the lowest position that sleeve member 14 can be positioned is a method of varying the time between unseating and reseating of the relief valve 12. In accordance with this invention the lowest position that sleeve member 14 will be permitted to drop along stem 13 is controlled by the novel relief valve of this invention. Turning now to FIGS. 2 and 3, a preferred embodiment of the improved relief valve 27 is illustrated.

Improved relief valve 27 comprises three basic components. These components are valve seal 28, sleeve member 34 and tube member 35. Valve seal 28 is constructed having a sealing member 29 that forms a seal with seat 10A of clamping disc 10 in the same manner as the conventional relief valve 12 described above. Sealing member 28 is provided with a shank 29A having a threaded exterior surface section 30 with a rod 31 extending perpendicular from the bottom end 32 of shank 29A. Rod 31 is provided with a shoulder 33 that acts as a stop to retain sleeve member 34 about rod 31. Sealing member 28 and shank 29A are preferably constructed as a single unit. Tube member 35 is provided with a passageway 36 extending along the tube member vertical axis from the top end 37 to the bottom end 38 of tube member 35. The upper body section 39 of tube member 35 forms a threaded interior surface 40 that has a pitch and diameter to permit it to be screwed onto threaded shank surface section 30.

Tube member passageway 36 has a diameter sufficient in size and shape to permit sleeve member 34 to freely travel vertically within passageway 36 as it slides along rod 31. Sleeve member 34 is provided with an upper shoulder 41 having a greater diameter than sleeve shaft 42. Tube member 35 has a lower body section 43 provided with one or more stop members to prevent sleeve upper shoulder 41 from passing completely through passageway 36. There are many known stop means that can be used. Illustrated in FIGS. 2, 2A, 2B and 2C are three different alternate preferred embodiments of stop members. In the first embodiment illustrated in FIGS. 2 and 2A, a set of screws 44 and 45 acts as the stop member. Screws 44 and 45 are screwed into openings 46 and 47, respectively, a distance sufficient to prevent sleeve shoulder 41 from passing past screws 44 and 45, while still allowing sleeve shaft 42 to pass. In the second embodiment illustrated in FIG. 2B, lower lip 48 extends from interior wall surface 49 and into tube member passageway 36 to act as the stop member. Lower lip 48 will extend into passageway section 36 a sufficient distance to permit sleeve shoulder 41 to rest on the top surface 50 of lip 48, but still permit sleeve shaft 42 to pass out the bottom of tube member passageway 36. In a third preferred embodiment illustrated in FIG. 2C, the stop is formed by crimping the lower body section 43 to form a dimple 51 that protrudes a distance into tube member passageway section 36 sufficiently to prevent sleeve shoulder 41 from passing through passageway 36, but still permit sleeve shaft 42 to pass out the bottom of passageway 36.

The distance that the sleeve bottom end 38 can drop when the flush valve is activated can be adjusted by screwing tube member 35 up or down relief valve shank 29A. This distance is directly related to the time between the unseating and reseating of relief valve 27. In a more preferred embodiment the pitch of the threads on relief valve shank 29A are set so that one 360° turn of tube member 35 will vary the volume of water flowing through the diaphragm flush valve during a flushing operation approximately one gallon. It has been found that this setting enables one to make the necessary adjustments to water pressure with a minimum amount of adjustment.

In a more preferred embodiment as illustrated in FIG. 2, lower body section 43 of tube member 35 is provided with a cutout area 52. Cutout area 52 is shaped and sized to permit a person to visually determine when tube member 35 has been sufficiently screwed up on shank 29A to cause the stop to contact sleeve member shoulder 41. The cutout area 52 is also preferably sized to visually determine the amount of adjustment to the distance that the sleeve member 35 can drop when the flushing action is activated.

In another preferred embodiment tube member 35 is constructed having gap 53 extending through the vertical length of upper body section 39 and into cutout area 52. In this embodiment tube member 35 is constructed from material of sufficient flexibility and resiliency to permit gap 53 to be opened wider to permit tube member 35 to be positioned about sleeve member 34. It is preferred that the vertical length of upper body section 39 be less than about the distance between shoulder top surface 54 and shaft bottom surface 32.

Figure 4:
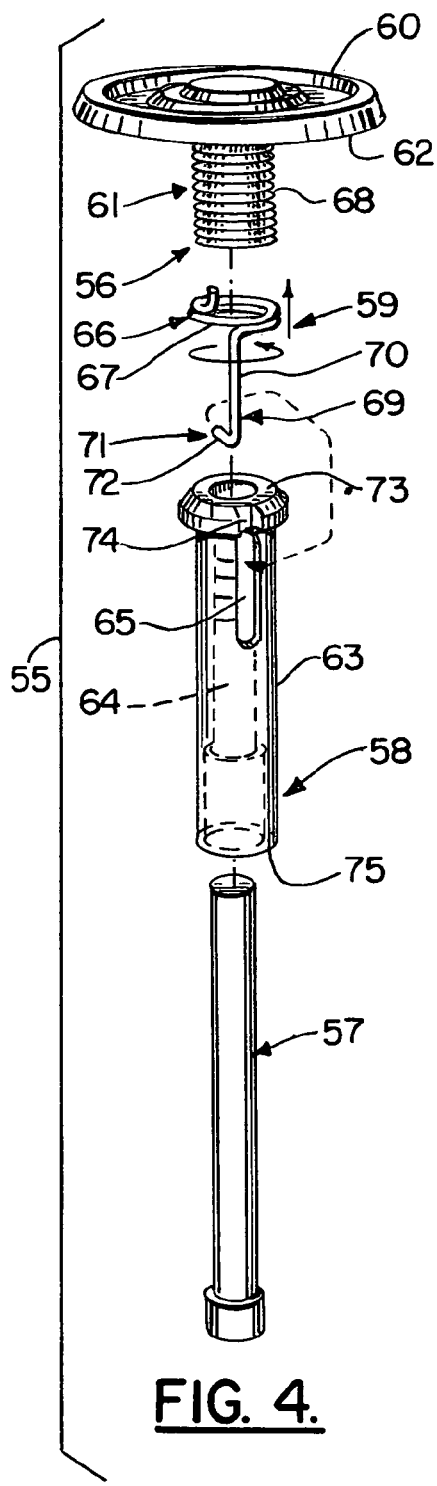
FIG. 4 is an exploded view of an alternate preferred embodiment of the relief valve of this invention.
Figure 5:
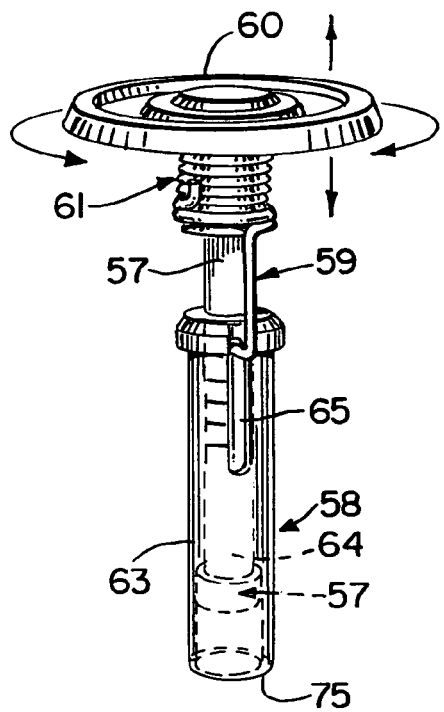
FIG. 5 is a three-quarter view of the retaining member illustrated in FIG. 4.

Referring now to the alternate preferred embodiment illustrated in FIGS. 4-5, relief valve 55 comprises valve seat 56, rod 57, sleeve member 58, and retaining member 59. Valve seat 56 includes sealing member 60 with threaded shaft 61 extending perpendicularly downward from the bottom surface 62 of seating member 60.

Sleeve member 58 is a hollow cylinder 63 having a passageway 64 extending along its central axis. Passageway 64 is sized to permit rod 57 to slide vertically within passageway 64. Cylinder 63 is provided with a vertical slit 65 extending partially down the side of cylinder 63.

Retaining member 59 includes an upper section 66 shaped and sized to thread onto threaded shaft 61 in either direction indicated by the arrows in FIG. 4. In a preferred embodiment upper section 66 is constructed from wire that is coiled to form a pitched series of loops 67 operatively fitting about threads 68 to permit the position of upper section 66 on threads 68 to move vertically by rotating the loops 67 on threads 68.

Retaining member 59 also includes middle section 69 connecting the upper section 66 to a lower stopping section 71. In a preferred embodiment middle section 69 is a vertical straight extension 70 of the wire forming loops 67. It also preferred that lower stopping section 71 be constructed from a horizontally extending extension 72 of the wire forming loops 67. Extension 72 is of sufficient length to extend into slit 65 when retaining member 57 has been threaded onto threaded shaft 61, but is restricted in length not to protrude into passageway 64 to impede the vertical movement of rod 57 in passageway 64.

In a more preferred embodiment sleeve member shoulder 73 is provided with a vertical channel 74 sized to accommodate wire extension 70 being placed in channel 74 to reduce the overall width of the retaining member 59 in order to prevent having to enlarge central opening 9 found in conventional flush valves. This permits the relief valve 55 to be retrofitted into a conventional flush valve without any modifications to the other elements of the flush valve.

The distance that the sleeve bottom end 75 can drop when the flush valve is activated can be adjusted by screwing the wire loops 67 up or down relief valve threaded shaft 61. This distance is directly related to the time between the unseating and reseating of relief valve 55.

There are of course other alternate embodiments that are obvious from the foregoing descriptions of the invention. These alternate embodiments are intended to be included within the scope of the invention as defined by the following claims.

What I claim is:

1. A relief valve for use in a diaphragm flush valve, the relief valve having a seating member, a shaft extending downward from the seating member, a stem affixed to the shaft and extendable down through a guide member of the diaphragm flush valve, and a sleeve member structured to slide on the stem, the improvement to which comprises:
   (a) the shaft having a threaded exterior surface and a lower end;
   (b) a retaining member having an upper section, and a middle section connecting the upper section to a lower stopping section, wherein the upper body section being sized and shaped to screw onto the threaded exterior surface of the shaft, and the lower stopping section comprises a stop member extending into a vertical slit in the sleeve member; and
   (c) wherein the retaining member is constructed from a wire coiled at one end to form the upper section with the middle section of the wire extending vertically downward from the upper section and with an opposing end of the wire bent perpendicularly to the middle section to form the stop member having a length sufficient to extend into the vertical slit;
   (d) wherein the retaining member is constructed from a wire coiled at one end to form the upper section with the middle section of the wire extending vertically downward from the upper section and with an opposing end of the wire bent perpendicularly to the middle section to form the stop member having a length sufficient to extend into the vertical slit.

2. A relief valve for use in a diaphragm flush valve, the relief valve having a seating member, a shaft extending downward from the seating member, a stem affixed to the shaft and extendable down through a guide member of the diaphragm flush valve, and a sleeve member structured to slide on the stem, the improvement to which comprises:
   (a) the shaft having a threaded exterior surface and a lower end;
   (b) a retaining member having an upper section, and a middle section connecting the upper section to a lower stopping section, wherein the upper body section being sized and shaped to screw onto the threaded exterior surface of the shaft, and the lower stopping section comprises a stop member extending into a vertical slit in the sleeve member; and
   (c) wherein the sleeve member is provided with a vertical channel in its exterior wall sized to accommodate the middle section of the wire.

* * * * *